United States Patent Office 3,239,559
Patented Mar. 8, 1966

3,239,559
PREPARATION OF AROMATIC DISULFONATES
Edward J. McNelis, Wallingford, Pa., assignor to Sun Oil Company, Philadelphia, Pa., a corporation of New Jersey
No Drawing. Filed Sept. 14, 1962, Ser. No. 223,820
6 Claims. (Cl. 260—505)

This invention relates to a method for preparing alkali metal aromatic disulfonates from alkali metal aromatic monosulfonates. In one embodiment it relates to a method for preparing alkali metal naphthalene-2,6-disulfonates from alkali metal naphthalene monosulfonates. In another embodiment it relates to the preparation of alkali metal benzene p-disulfonates from alkali metal benzene monosulfonates.

Aromatic disulfonates are of value as emulsifying agents, wetting agents, detergents, and also find particular utility as chemical intermediates in the preparation of dyestuffs. It is known in the art that alkali metal aromatic disulfonates can be prepared from alkali metal aromatic monosulfonates. For example, in British Patent No. 839,663, June 29, 1960, it is shown that alkali metal aromatic disulfonates can be formed by subjecting an alkali metal aromatic monosulfonate to high temperatures (200°–600° C.) for extended periods of time (2–10 hours) under high pressures (750–3000 p.s.i.) either in the presence or absence of a catalytic material, such as antimony sulfate. A method has now been found, however, whereby alkali metal aromatic disulfonates can be prepared from alkali metal aromatic monosulfonates in much greater yields than achieved heretofore.

It is therefore an object of this invention to provide an improved method for preparing alkali metal aromatic disulfonates.

It is another object of this invention to provide an improved method for preparing alkali metal aromatic disulfonates from alkali metal aromatic monosulfonates.

It is another object of this invention to provide an improved method for preparing alkali metal naphthalene-2,6-disulfonates or alkali metal benzene p-disulfonates from alkali metal naphthalene monosulfonates or alkali metal benzene monosulfonates respectively in good yields.

It is a further object of this invention to provide an improved method for preparing alkali metal naphthalene-2,6-disulfonates or alkali metal benzene p-disulfonates from alkali metal naphthalene monosulfonates or alkali metal benzene monosulfonates respectively wherein the use of inordinately high pressures is avoided.

It is a further object of this invention to provide an improved method for preparing alkali metal naphthalene-2,6-disulfonates or alkali metal benzene p-disulfonates from alkali metal naphthalene monosulfonates or alkali metal benzene monosulfonates respectively using a novel catalyst.

It is a still further object of this invention to provide an improved method for preparing alkali metal naphthalene-2,6-disulfonates or alkali metal benzene p-disulfonates from alkali metal naphthalene monosulfonates or alkali metal benzene monosulfonates respectively wherein the reaction time is substantially less than two hours.

Other objects of this invention will be apparent from the following description and appended claims.

Briefly stated, this invention comprises heating an alkali metal aromatic monosulfonate such as sodium naphthalene monosulfonate or sodium benzene monosulfonate to an elevated temperature in the presence of a catalyst for a specific period of time under a suitable pressure, cooling the reaction mixture and recovering an alkali metal aromatic disulfonate, e.g., sodium naphthalene-2,6-disulfonate or sodium benzene p-disulfonate.

The reactions involved may be depicted by the following equations:

(A) 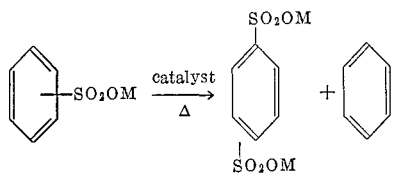

(B) 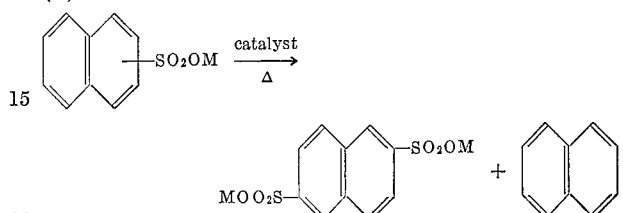

wherein M is an alkali metal selected from the group consisting of sodium, potassium, rubidium, and cesium.

The catalysts to be used in accordance with this invention are the salts and oxides of cadmium, zinc, or mercury. Suitable catalysts include zinc oxide, mercuric oxide, cadmium bromide, zinc bromide, mercury chloride, zinc chloride, and cadmium oxide. It is preferred to use compounds of cadmium, particularly a cadmium halide and most preferably cadmium chloride as the catalyst. The amount of catalyst used ranges from about 2.5 mol percent to about 15 mol percent based on the amount of alkali metal aromatic monosulfonate starting material. Amounts of catalyst in excess of 15 mol percent are preferably to be avoided in order that the yield of desired disulfonate product be maximized. It is most preferred to use an amount of catalyst ranging between about 2.5 mol percent and 7.5 mol percent based on the amount of alkali metal aromatic monosulfonate starting material.

The conversion of the alkali metal aromatic monosulfonate to the alkali metal aromatic disulfonate according to the process of this invention is preferably conducted under pressure in the presence of an inert gas. Suitable inert gases which can be used are carbon dioxide, nitrogen, methane, helium, and the like; it is preferred, however, to use carbon dioxide. The initial pressure of the inert gas as measured at ambient or room temperature ranges between about 100 p.s.i.g. and 400 p.s.i.g., preferably between 250 p.s.i.g. and 300 p.s.i.g.

The manner in which the alkali metal aromatic monosulfonate starting material is heated is important in order that high yields of alkali metal aromatic disulfonate may be obtained. The monosulfonate starting material is heated to a temperature in excess of 400° C. and less than 550° C., then cooled to a temperature below 400° C. The total time that the reaction mass is in excess of 400° C. should not exceed about one hour. More preferably, the monosulfonate starting material is heated to a temperature in excess of 450° C. and less than 550° C., then cooled to a temperature less than 400° C., with the total time that the temperature is in excess of 400° C. being less than 0.5 hr.

While any alkali metal aromatic monosulfonate, such as sodium benzene monosulfonate, potassium benzene monosulfonate, rubidium benzene monosulfonate, cesium benzene monosulfonate, potassium naphthalene monosulfonate, rubidium naphthalene sulfonate or cesium naphthalene sulfonate, can be converted to the corresponding alkali metal aromatic disulfonate according to the process of this invention, the process is illustrated in the following examples using sodium naphthalene monosulfonate as a representative material.

Example I

Into an autoclave there were placed 4.60 grams of sodium naphthalene-2-sulfonate. The autoclave was initially pressured to 300 p.s.i.g. with carbon dioxide and heated to 500° C. When the temperature reached 500° C., the application of heat was discontinued and the reaction mass was allowed to cool to ambient temperature. The time interval required to heat the reaction mass from 400° C. to 500° C. and cool to 400° C. was about 30 minutes. The reaction mass was washed from the autoclave with diethyl ether and upon evaporation of the ether there was recovered 204 mg. of naphthalene. Subsequent washings with water removed any ether-insoluble material from the autoclave which had been formed. The water phase was extracted with diethyl ether and there was recovered 10 mg. of unidentified material. The water phase was adjusted to a slightly basic pH by the addition of sodium hydroxide. Upon evaporation of the water there was recovered 3.93 grams of material which was identified by infra-red analysis as sodium naphthalene-2-sulfonate, thus indicating that no conversion to the desired disulfonate had taken place.

Example II

Example I was repeated with the exception that there was also initially charged to the autoclave 0.184 gram of cadmium chloride as a catalyst. There was recovered 1.367 grams of naphthalene and 2.50 grams of material which was identified by infra-red analysis as sodium naphthalene-2,6-disulfonate, representing a 75 percent yield of theory as compared with a 28 percent yield of theory obtained by prior art methods, e.g., Example V of British Patent No. 839,663, June 29, 1960.

It is thus apparent from the foregoing examples that according to the process of this invention, alkali metal aromatic monosulfonates may be converted in substantial yields to dialkali metal aromatic disulfonate.

Substantially similar results are obtained when the other alkali metals are substituted for sodium or when benzene monosulfonates are substituted for naphthalene monosulfonates, or when cadmium oxide or the oxides or salts of zinc or mercury are substituted for salts of cadmium, although in such other cases different yields may be obtained.

I claim:
1. A method for preparing an alkali metal naphthalene disulfonate which comprises heating an alkali metal naphthalene monosulfonate to a temperature in excess of 400° C. and less than 550° C., then cooling the reaction mixture to a temperature below 400° C., the total time that the reaction mixture is in excess of 400° C. being less than one hour, said heating and cooling being conducted in an inert atmosphere in the presence of a catalyst selected from the group consisting of salts and oxide of cadmium, zinc, and mercury and thereafter recovering said disulfonate.
2. Method in accordance with claim 1 wherein the monosulfonate is heated to a temperature of at least 450° C.
3. Method in accordance with claim 2 wherein the monosulfonate is a sodium naphthalene sulfonate and the disulfonate is sodium naphthalene-2,6-disulfonate.
4. Method in accordance with claim 3 wherein the catalyst is cadmium chloride.
5. Method in accordance with claim 1 wherein the monosulfonate is a sodium naphthalene monosulfonate and the disulfonate is sodium naphthalene-2,6-disulfonate.
6. Method in accordance with claim 5 wherein the catalyst is cadmium chloride.

References Cited by the Examiner

UNITED STATES PATENTS 2,978,500  4/1961  Goodman et al. _____ 260—505

FOREIGN PATENTS 1,083,258  6/1960  Germany.
839,663    6/1960  Great Britain.

OTHER REFERENCES

Obermiller, Ber. Deut. Chemie, vol. 43, 1910, pages 1413–1417.

LORRAINE A. WEINBERGER, *Primary Examiner.*
LEON ZITVER, *Examiner.*